United States Patent
Onozawa et al.

(10) Patent No.: US 6,356,754 B1
(45) Date of Patent: *Mar. 12, 2002

(54) VOICE RECORDING METHOD FOR MOBILE COMMUNICATION APPARATUS

(75) Inventors: Katsuyuki Onozawa; Fujio Inagami; Hiroshi Fujita; Osamu Kawano, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/819,728

(22) Filed: Mar. 18, 1997

(30) Foreign Application Priority Data

Sep. 4, 1996 (JP) .............................. 8-234556

(51) Int. Cl.[7] .......................... H04M 11/10; H04M 1/00; H04M 1/64; H04B 1/38
(52) U.S. Cl. ...................... 455/412; 455/550; 379/67.1; 379/68
(58) Field of Search ................................. 455/412, 550; 379/88, 93.03; 701/201, 500, 501, 503, 504; 704/275; 395/405, 88.28

(56) References Cited

U.S. PATENT DOCUMENTS

| 5,003,576 A | * | 3/1991 | Helferich | 455/412 |
| 5,349,699 A | * | 9/1994 | Erben et al. | 455/186.1 |
| 5,499,286 A | * | 3/1996 | Kobayashi | 455/550 |
| 5,566,311 A | * | 10/1996 | Gochi | 395/405 |
| 5,740,543 A | * | 4/1998 | Maeda | 455/412 |
| 5,790,957 A | * | 8/1998 | Heidari | 455/412 |
| 5,805,674 A | * | 9/1998 | Anderson, Jr. | 379/93.03 |
| 5,839,110 A | * | 11/1998 | Maeda et al. | 704/275 |

FOREIGN PATENT DOCUMENTS

| JP | 1-105627 | 4/1989 |
| JP | 4-336790 | 11/1992 |
| JP | 7-87562 | 3/1995 |

* cited by examiner

Primary Examiner—Dwayne Bost
Assistant Examiner—Raymond Persino
(74) Attorney, Agent, or Firm—Rosenman & Colin LLP

(57) ABSTRACT

In a mobile communication apparatus having a codec which codes first voice data into second voice data and decodes the second voice data into the first voice data, a memory in which the second voice data should be recorded and a silent data generating unit which generates silent data, the second voice data is successively recorded in the memory. While the second data is being recorded, the silent data is recorded in the memory as a substitute for the second voice data which is in a first state. The first state is a state in which the second voice data may be noise data.

8 Claims, 12 Drawing Sheets

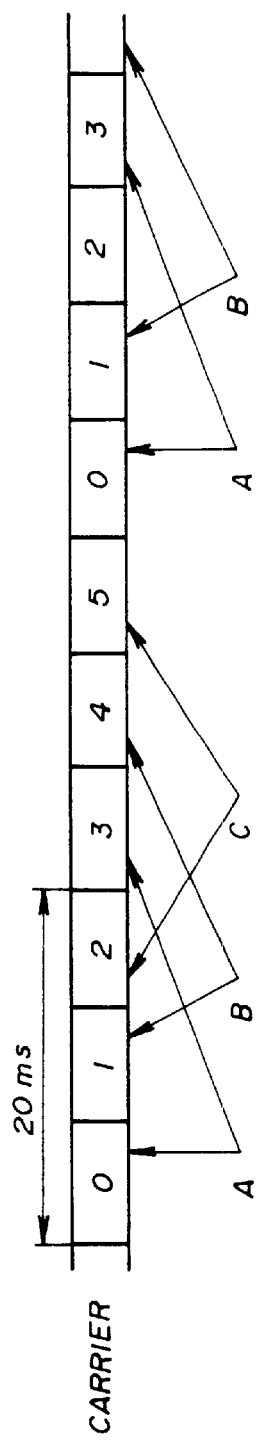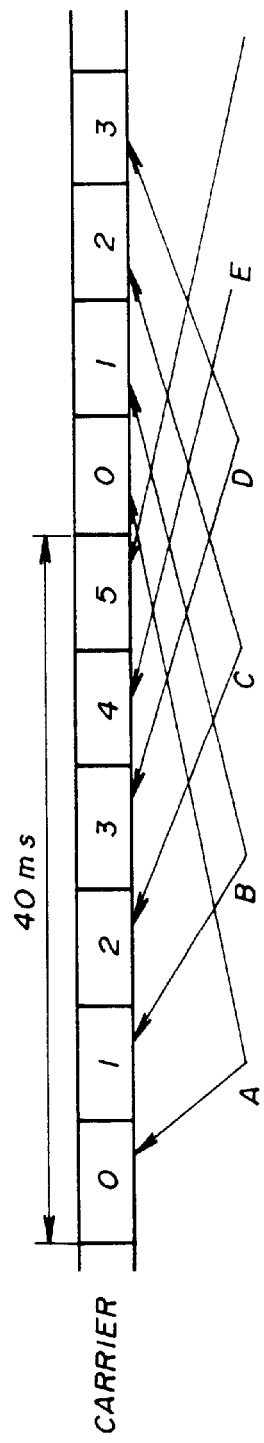
FIG.2A  FIG.2B  FIG.2C

VOICE RECORDING METHOD FOR MOBILE COMMUNICATION APPARATUS

BACKGROUND OF THE INVENTION

(1) Field of the Invention

The present invention generally relates to a voice recording method for a mobile communication apparatus, and more particularly to a voice recording method by which voice signals received by a mobile communication apparatus and a voice signal corresponding to a voice of a user of the mobile communication apparatus can be efficiently recorded and clearly reproduced.

(2) Description of the Related Art

In recent years, portable telephones have been developed and various types of portable telephones are being used by general subscribers. The portable telephones are telephones generally used in mobile communication. For effective utilization of frequency bands, digital-type portable telephones in which voice signals are digitalized at a low bit rate and transmitted have been put to practical use. With the spread of the portable telephone, various convenient functions have been added to the portable telephone. One of the various convenient functions is; a function called "VOICE MEMO" by which downward voices are recorded during a call. Another one of the various convenient functions is a function by which a voice of an operator is recorded in a stand-by state FIG. 1 shows a structure of a conventional digital-type portable telephone having a voice recording function.

Referring to FIG. 1, the digital-type portable telephone has an antenna 100, a sharing unit 101, a transmitter 102, a receiver 103, a TDMA processing circuit 104, a codec 105, a controller 106, a microphone 107, a loudspeaker 108 and a recording memory 109. The codec 105 is formed of a coder and a decoder. By the codec 105, voice input to the microphone 107 is converted into PCM data (64 kbps) and the PCM data is further converted into voice data having a lower bit rate. In addition, the codec 105 converts received voice data having a low bit rate into the PCM data and then converts the PCM data into an analog signal. The analog signal is supplied to the loudspeaker 108, so that voice is output from the loudspeaker 108.

There are various types of digital-type portable telephones, so that there are various types of codecs. In order to realize efficient communication, a coding method at a lower bit rate is being researched.

In a case of recording received voice, it is an easy matter to record analog voice signals output from the codec 105 or corresponding PCM data in the codec 105. In addition, in a case of recording a voice of an operator, it is an easy matter to record analog voice signals output from the microphone 107 or corresponding PCM data.

However, the conventional voice recording method for the mobile communication apparatus has the following disadvantages.

In the mobile communication system, in order to effectively employ frequencies, the same frequency is employed in different service areas (zones). This system is referred as a cellular system. In this system, different frequencies are employed in zones adjacent to each other. Thus, when a user of the portable telephone is moved from a zone to an adjacent zone, in the portable telephone, a channel switching process for switching the frequency is carried out to continue the call. The channel switching process requires a transition time during which a frequency is switched to another frequency.

Thus, in the conventional digital-type portable telephone as shown in FIG. 1, when the frequency is switched, an error occurs in the voice data in the frequency transition. As a result, recorded voice has noises.

In addition, when the coding rate in the codec 105 is lowered, many channels can be set in a transmission band. In this case, the frequencies can be effectively employed. Thus, if a codec having a lower coding rate is developed, a portable telephone having a codec which operates in two modes using different coding rates can be made. This type of codec is referred to as a dual-rate codec. In a case of the portable telephone having the dual-rate codec, when the user calling through the portable telephone in a mode using a lower coding rate is moved into a zone in which only a higher coding rate is acceptable, the mode using the lower coding rate has to be switched to the mode using the higher coding rate.

However, the conventional portable telephone shown in FIG. 1 has the codec 105 using a single coding rate. Thus, a voice recording apparatus used for the portable telephone having the dual-rate codec has not yet been developed. Thus, in the conventional portable telephone having the dual-rate codec, when the mode of the coding rate is switched, voice is recorded with noises.

SUMMARY OF THE INVENTION

Accordingly, a general object of the present invention is to provide a novel and useful voice recording method for a mobile communication apparatus.

A specific object of the present invention is to provide a voice recording method for a mobile communication apparatus by which voice can be efficiently recorded.

Another object of the present invention is to provide a voice recording method for a mobile communication apparatus by which voice can be recorded so as to be clearly reproduced even if a channel switching operation or a mode switching operation is carried out in the codec.

The above objects of the present invention are achieved by a voice recording method for a mobile communication apparatus having a codec which codes first voice data into second voice data and decodes the second voice data into the first voice data, a memory in which the second voice data should be recorded and a silent data generating unit which generates silent data, the method comprising the steps of: (a) successively recording the second voice data in the memory; and (b) recording the silent data in the memory as a substitute for the second voice data which is in a first state while the second voice data is being recorded in step (a), the first state being a state in which the second voice data may be noise data.

According to the present invention, the silent data is recorded in the memory as a substitute for the second voice in a case where the second voice may be noises. Thus, voice can be recorded so as to be clearly reproduced even if the voice may be noises in a case where a channel switching operation or a mode switching operation is carried out in the codec. Thus, the voice which has been recorded can be clearly reproduced without noises.

Another object of the present invention is to provide a mobile communication apparatus in which voice is recorded according to the above voice recording method.

The above object of the present invention is achieved by a mobile communication apparatus having a voice recording unit, wherein the voice recording unit comprises: a codec which codes first voice data into second voice data and decodes the second voice data into the first voice data; a memory in which the second voice data should be recorded; a silent data generating unit which generates silent data; and a control unit which causes the silent data to be recorded in the memory as a substitute for the second voice data which is in a first state, the first state being a state in which the second voice data may be noise data.

It is preferable that the second voice data is recorded in the memory in a first period in which the codec does not generated voice data to be transmitted and received. In this case, the second voice data can be efficiently recorded in the memory having a small capacity.

BRIEF DESCRIPTION OF THE DRAWINGS

Other objects, features and advantages of the present invention will be apparent from the following description when read in conjunction with the accompanying drawings, in which:

FIGS. 2A and 2B are diagrams illustrating examples of frame formations of a single transmission signal in the recommendation of RCR 27-C.

FIG. 2C is a table illustrating characteristics of transmission modes respectively using the above frame formations;

DESCRIPTION OF THE PREFERRED EMBODIMENTS

A description will be given, with reference to the drawings, of an embodiment of the present invention.

A voice recording method is applicable to a portable telephone system provided in the "DIGITAL-TYPE AUTOMOBILE TELEPHONE SYSTEM STANDARD RCR 27-C". An air-interface between a mobile station and a base station is defined in the "DIGITAL-TYPE AUTOMOBILE TELEPHONE SYSTEM STANDARD RCR 27-C".

A description will be given of the outline of the "DIGITAL-TYPE AUTOMOBILE TELEPHONE SYSTEM STANDARD RCR 27-C" before the description of a voice recording method according to the embodiment of the present invention. Hereinafter, the "mobile station" is a concept including a "portable telephone", a "automobile telephone", "a coastal mobile telephone", an "aeronautical telephone" and the like.

Examples of frame formations of a single transmission signal recommended in the RCR 27-C are shown in FIGS. 2A and 2B. FIG. 2A shows a case of a full-rate mode and FIG. 2B shows a case of a half-rate mode. FIG. 2C shows characteristics of the above modes. The full-rate mode and the half-rate mode represent coding modes of the codec. According to the above recommendation, each transmission signal is multiplexed with six frames and has a transmission speed of 42 kbps.

In the full-rate mode, a coding rate of voice data is equal to 11.2 kbps, so that voice information is transmitted two frames apart. Thus, three channels A through C can be formed in a single transmission signal as shown in FIG. 2A.

In the half-rate mode, a coding rate of voice data is equal to 5.6 kbps, so that voice information is transmitted five frames apart. Thus, six channels A through F can be formed in a single transmission signal as shown in FIG. 2B. That is, in the half-rate mode, a great number of channels can be formed in a single transmission signal, so that may subscribers can be accommodated. The utilization of the frequency can be improved in the half-rate mode.

In addition, the voice data in the full-rate mode and the half-rate mode includes error correction codes. In a case of the reception, the voice data to which the error correction process is applied is converted into PCM data.

Figure 1:
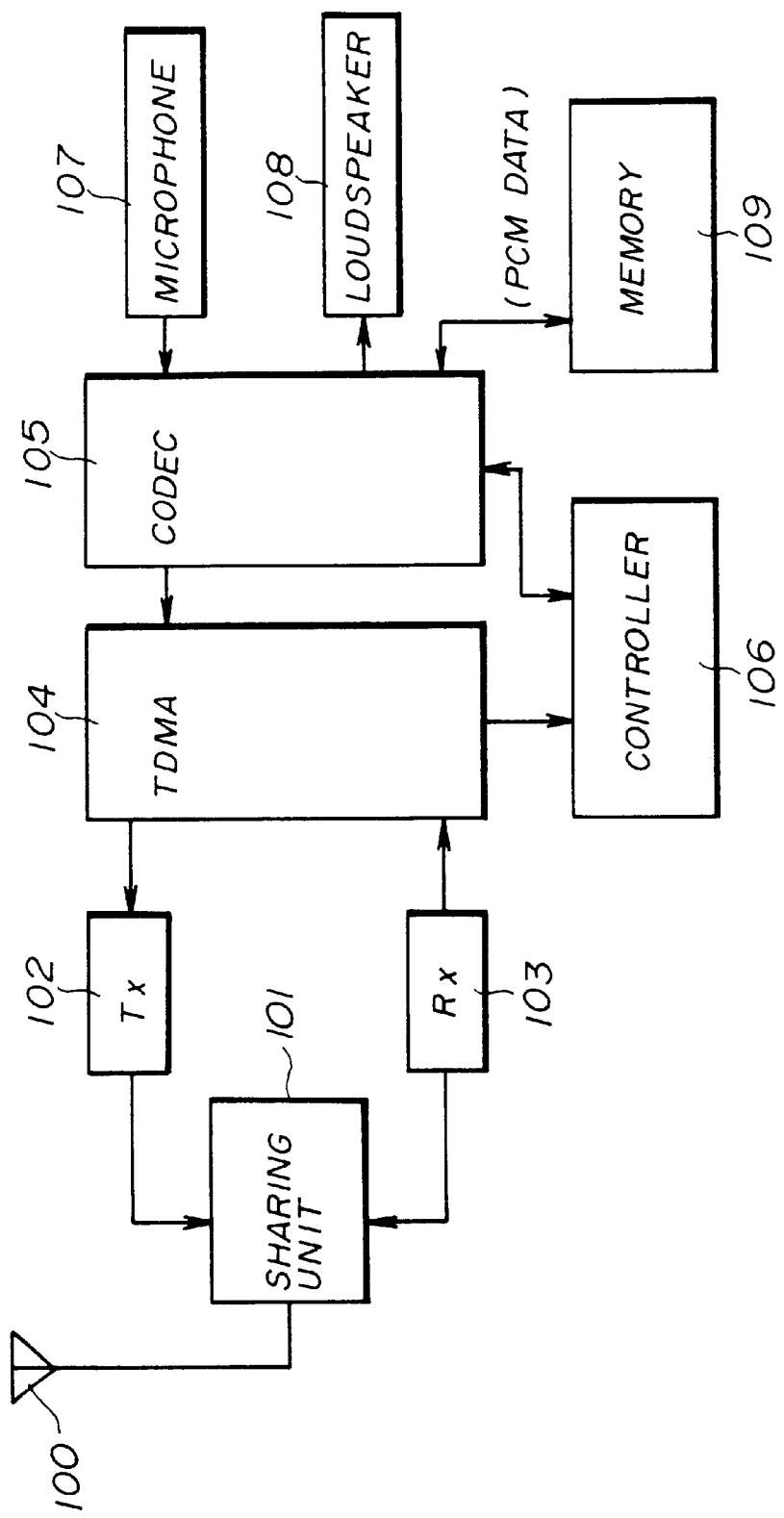
FIG. 1 is a block diagram illustrating a structure of a conventional digital-type portable telephone.
Figure 3A:
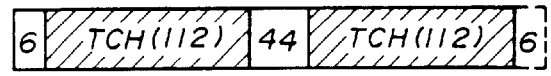
FIGS. 3A and 3B are diagrams illustrating formations of each frame shown in FIGS. 2A and 2B.
Figure 3B:
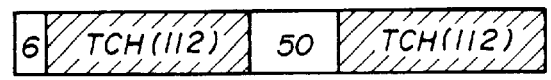

Each of the frames shown in FIGS. 2A and 2B is formed as shown in FIGS. 3A and 3B. FIG. 3A shows a frame formation of an upward signal (transmitted from a mobile station to a base station). FIG. 3B shows a frame formation of a downward signal (transmitted from the base station to the mobile station).

Referring to FIGS. 3A and 3B, each of the frames includes traffic channels TCH used to transmit information such as voice. Other parts of each of the frames are provided with data used for control and synchronization.

Figure 4:
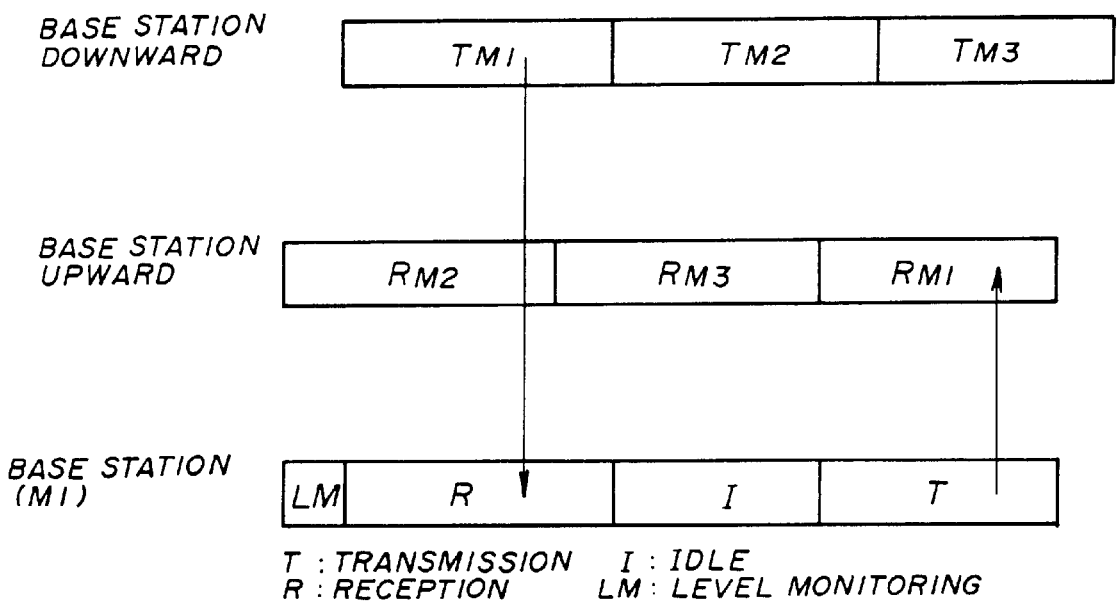
FIG. 4 is a diagram illustrating timings of transmission and reception in a full-rate mode between a base station and a portable telephone (terminal)

The transmission and reception in full-rate mode between the base station and the mobile station are performed as shown in FIG. 4. In FIG. 4, a symbol "T" represents the transmission frame and a symbol "R" represents the receiving frame. A symbol "LM" for the mobile station (MI) represents a period for which the mobile station monitors the level of a signal from the base station. A symbol "I" represents an idle period which can be used for various functions.

A downward signal from the base station is transmitted to three mobile stations. The base station receives signals from three terminals. The downward signal in the base station is shifted with respect to the upward signal in the base station. Thus, a terminal transmits a signal to the base station in the frame "T", monitors the signal from the base station in the frame "LM" and receives the signal from the base station in the frame "R".

A description will now be given of a mobile communication apparatus to which the voice recording method according to the present invention is applied.

Figure 5:
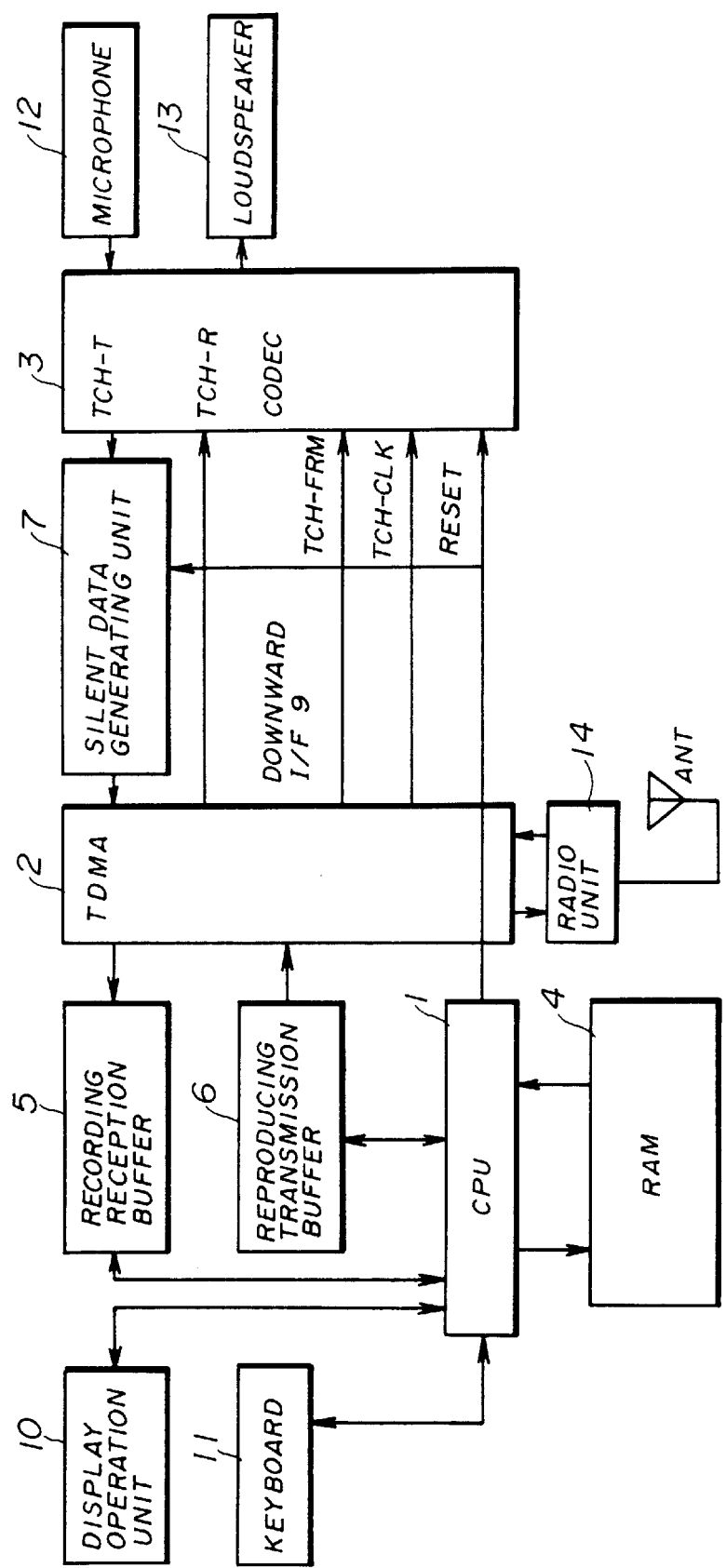
FIG. 5 is a block diagram illustrating a structure of a digital-type portable telephone to which a voice recording method according to the present invention is applied.

A digital-type portable telephone to which the voice recording method according to the embodiment of the present invention is formed as shown in FIG. 5.

Referring to FIG. 5, the digital-type portable telephone has a radio unit 14, a TDMA processing circuit 2, a codec 3, a microphone 12, a loudspeaker 13, a CPU 1, a display operation unit 10 and a keyboard 11. The digital-type portable telephone further has a silent data generating unit 7, a recording reception buffer memory 5, a reproducing transmission buffer memory 6 and a RAM 4. The codec 3, the silent data generating unit 7, the recording reception buffer memory 5, the reproducing transmission buffer memory 6 and the RAM 4 are used to record and reproduce voice.

General receiving and transmission operations are performed as follows.

In the receiving operation, signals received by an antenna (ANT) and the radio unit 14 in the slot "R" shown in FIG. 4 are supplied to the TDMA processing circuit 2. The TDMA processing circuit 2 detects only a frame directed to the present telephone from the received signals. The TDMA processing circuit 2 further extracts a control signal and an information signal (a signal in the TCH) from the frame. The control signal is supplied to the CPU 1. In a case where the information signal is voice data, the information signal is supplied to the codec 3 via a downward interface portion 9. In the full-rate mode, the voice data has a coding rate of 11.2 kbps, and in the half-rate mode, the voice data has a coding rate of 5.6 kbps.

The codec 3 eliminates error correction data from the voice data so that voice data having a lower rate is generated. The data having the lower rate is decoded into PCM data (64 kbps). The PCM data is converted into an analog signal, and the analog signal is then supplied to the loudspeaker 13. The voice corresponding to the analog signal is output from the loudspeaker 13.

In the transmission operation, a voice signal input through the microphone 12 is supplied to the codec 3. The codec 3 converts the voice signal into PCM data. The PCM data is converted into voice data with error correction codes. The voice data into which the PCM data is converted has the coding rate of 11.2 kbps in the full-rate mode or 5.6 kbps in the half-rate mode. The voice data is supplied to the TDMA processing circuit 2 via an upward interface portion 8 of the silent data generating unit 7. The TDMA processing circuit 2 allocates the voice data to frames for the transmission signal. Further, the transmission signal is transmitted to the base station in the slot "T" shown in FIG. 4.

Figure 6:
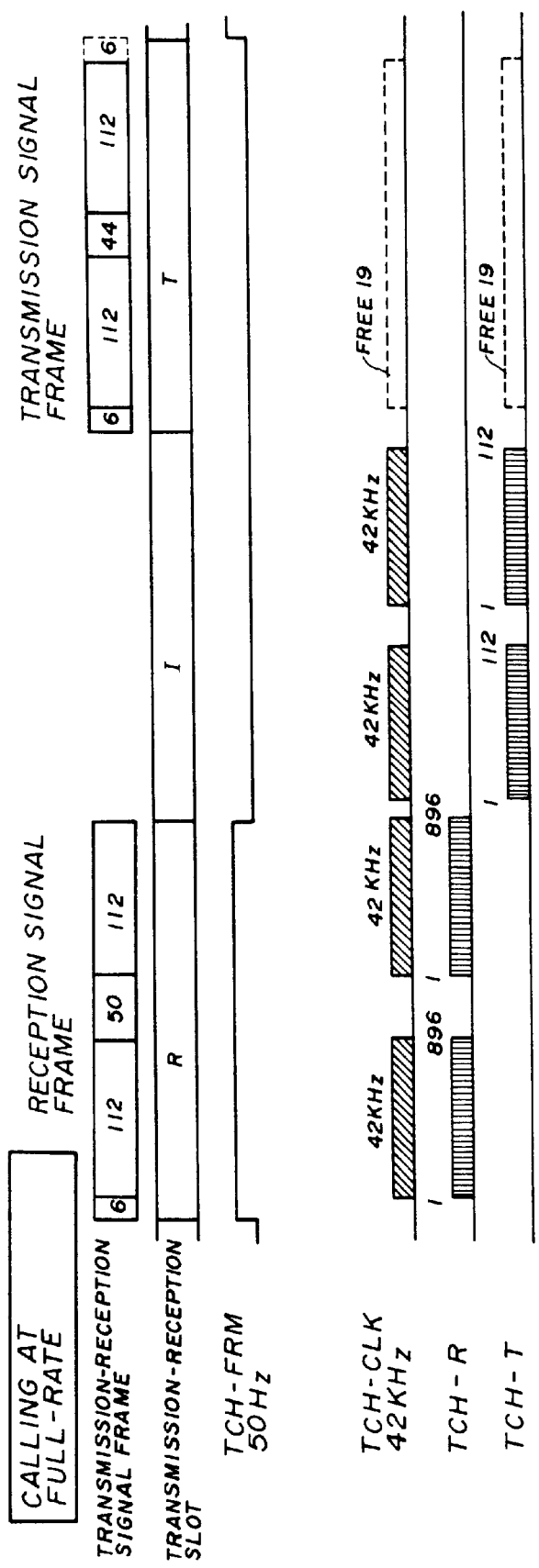
FIG. 6 is a timing chart illustrating output and input signals of a codec communicating in the full-rate mode.
Figure 7:
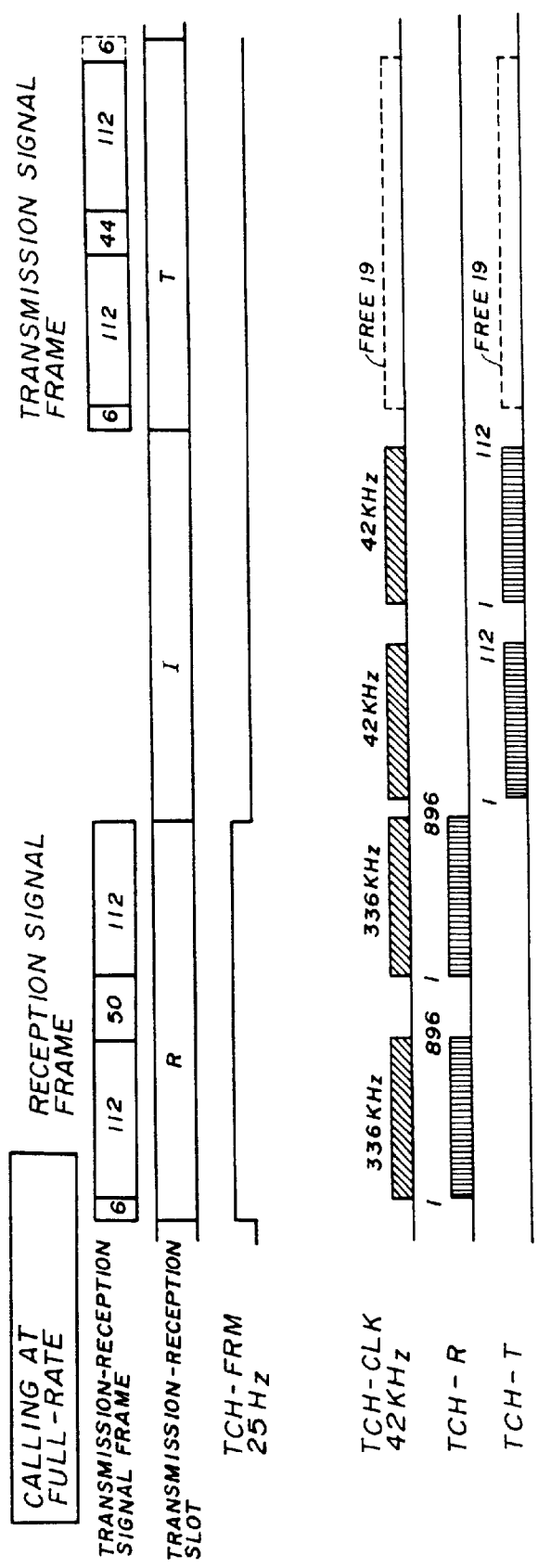
FIG. 7 is a timing chart illustrating output and input signals of a codec communicating in a half-rate mode.

The input and output signals of the codec 3 communicating in the full-rate mode and the half-rate mode are respectively shown in FIG. 6 and FIG. 7. In FIG. 6 and FIG. 7, formations in "TRANSMISSION-RECEPTION SIGNAL FRAME" and "TRANSMISSION-RECEPTION SLOT" depend on the communication between the mobile station and the base station. "TCH-FRM", "TCH-CLK", "TCH-R" and "TCH-L" represent input and output signals of the codec 3.

The "TCH-FRM" is a timing signal for the transmission and receiving operations in the full-rate mode and the half-rate mode. The "TCH-CLK" is a clock for input voice data and output voice data in the codec 3.

For example, in the full-rate mode as shown in FIG. 6, the receiving signal frame is received in the receiving slots "R" at intervals of 20 msec. The TDMA processing circuit 2 extracts receiving voice data having 112×2 bits from the receiving signal frame. The receiving voice data is input to a TCH-R terminal of the codec 3 via the downward interface portion 9, along with the "TCH-CLK".

In a slot of the next idle "I", the transmission voice data of 112×2 bits is generated. The transmission voice data is supplied from a TCH-T terminal of the codec 3 to the TDMA processing circuit 2 via the upward interface portion 8, along with the "TCH-CLK".

The TDMA processing circuit 2 assembles the control signal into the voice data and transmits the voice data to the base station in the next transmission slot "T".

In the half-rate mode as shown in FIG. 7, the receiving signal frame is received in the receiving slots "R" at intervals of 40 msec. In this case, to improve the error correction ability, each of bits is represented by using the likelihood factor of 8 bits (referred to as a soft decision). Thus, the voice data of 112×2 bits is converted into voice data of 112×8×2 bits and is then input to the TCH-R terminal of the codec 3. The transmission voice data is generated in a slot of the idle "I" in the same manner as in the full-rate mode. The transmission voice data is supplied from the TCH-T terminal to the TDMA processing circuit 2.

Referring to FIG. 6 and FIG. 7, the codec 3 does not operate in a period of the transmission slot "T", so that the TCH-CLK and the TCH-T terminal are not provided with signals. That is, due to the operation of the codec 3 as described above, a free frame 19 is formed.

The downward signal is recorded while receiving signals, as follows.

Figure 8:
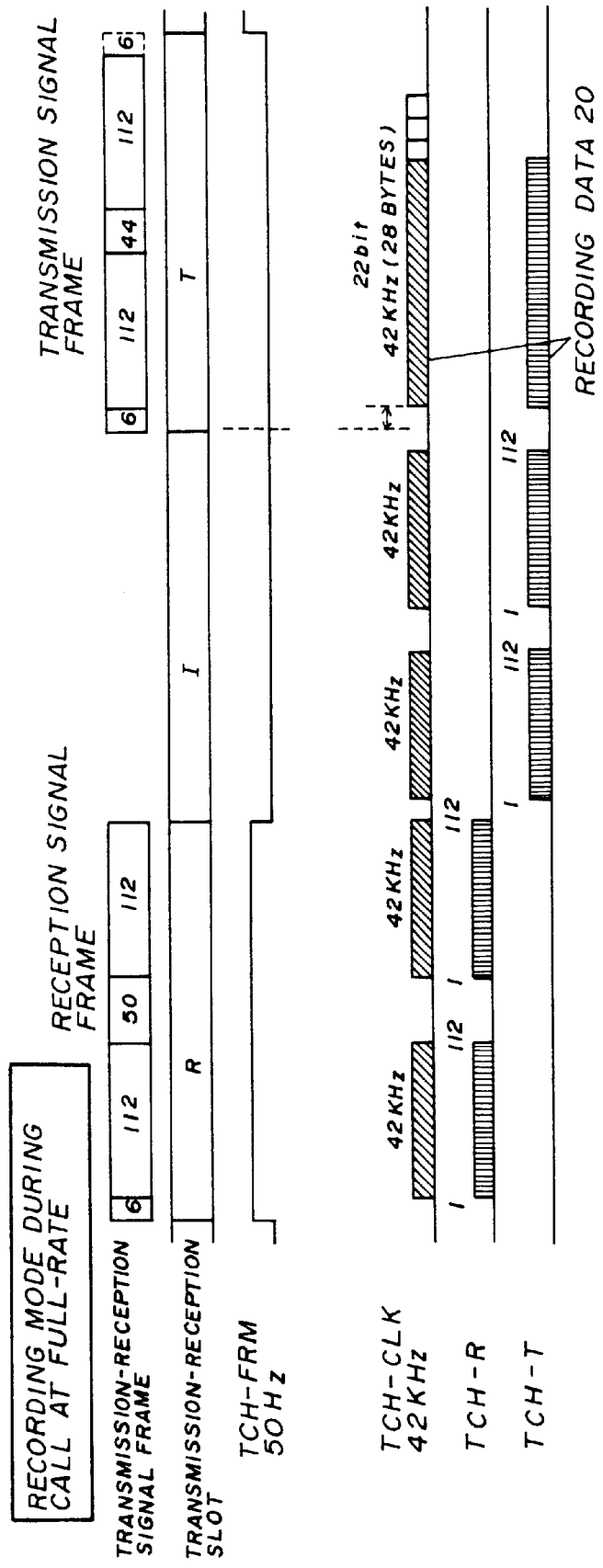
FIG. 8 is a timing chart illustrating input and output signals of the codec which is carrying out a voice recording operation while communicating in the full-rate mode.
Figure 9:
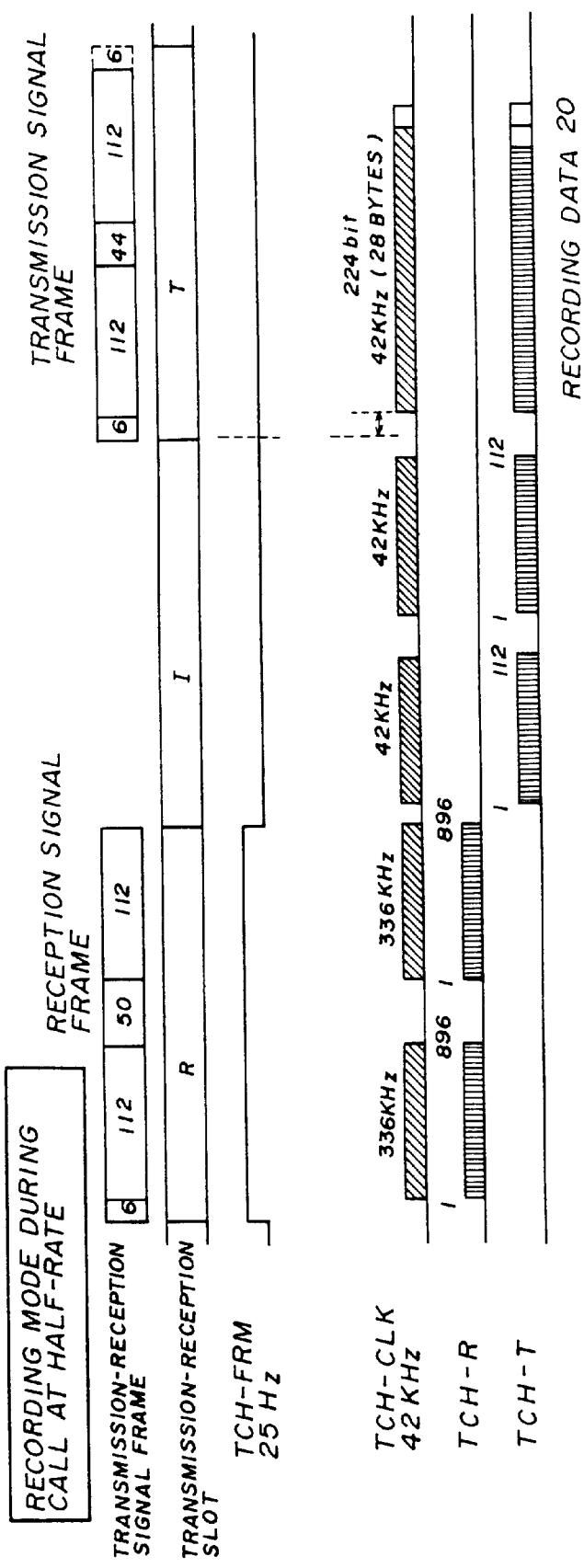
FIG. 9 is a timing chart illustrating input and output signals of the codec which is carrying out a voice recording operation while communicating in the half-rate mode.

The input and output signals of the codec 3 in the of the codec 3 which carries out the voice recording operation while communicating in the full-rate mode and the half-rate mode are respectively shown in FIG. 8 and FIG. 9.

In a case where the communication is performed in the full-rate mode, the codec 3 eliminates error correction bits from the received voice data of 112×2 and generates voice data having a lower rate. In the normal operation, the voice data is decoded into PCM data and is then output from the loudspeaker 13.

In the voice recording operation, the voice data having the lower rate is transmitted from the TCH-T terminal to the recording reception buffer memory 5 via the upward interface portion 8 and the TDMA processing circuit 2 as shown in FIG. 8, in a period of the free frame 19 shown in FIG. 6. The voice data stored in the recording reception buffer memory 5 is transmitted to the RAM 4 by a predetermined amount of data under the control of the CPU 1. In an actual case, the voice data is supplied to the recording reception buffer memory 5 and an interrupt signal is generated when the recording reception buffer memory 5 is filled with data. In response to the interrupt signal, the voice data is transmitted from the recording reception buffer memory 5 to the RAM 4. Due to the above operation, the voice data in the full-rate mode is stored in the memory (the RAM 4). The operation for the silent data (to be described later) is performed in the same manner as that for the voice data described above.

In the reproducing operation, the voice data stored in the RAM 4 is transmitted to the codec 3 via the TDMA processing circuit 3 under the control of the CPU 1. The codec 3 converts the voice data into the PCM data. The PCM data is further converted into an analog signal. The analog signal is supplied to the loudspeaker 13 so that voice corresponding to the analog signal is output from the loudspeaker 13.

In the recording operation while communicating in the half-rate mode, in the same manner as in the full-rate mode, the voice data having the lower rate is transmitted from the TCH-T terminal of the codec 3 to the recording reception buffer memory 5 via the upward interface portion 8 and the TDMA processing circuit 2 as shown in FIG. 9, in a period of the free frame 19 shown in FIG. 7. The voice data stored in the recording reception buffer memory 5 is transmitted to the RAM 4 by a predetermined amount of data under the control of the CPU 1. Due to the above operation, the voice data in the half-rate mode is recorded in the memory (the RAM 4).

The reproducing operation is substantially equivalent to the recording operation as described above.

When the mode is switched in the codec 3 while the downward signal is being recorded, the operations are performed as follows.

Figure 10:
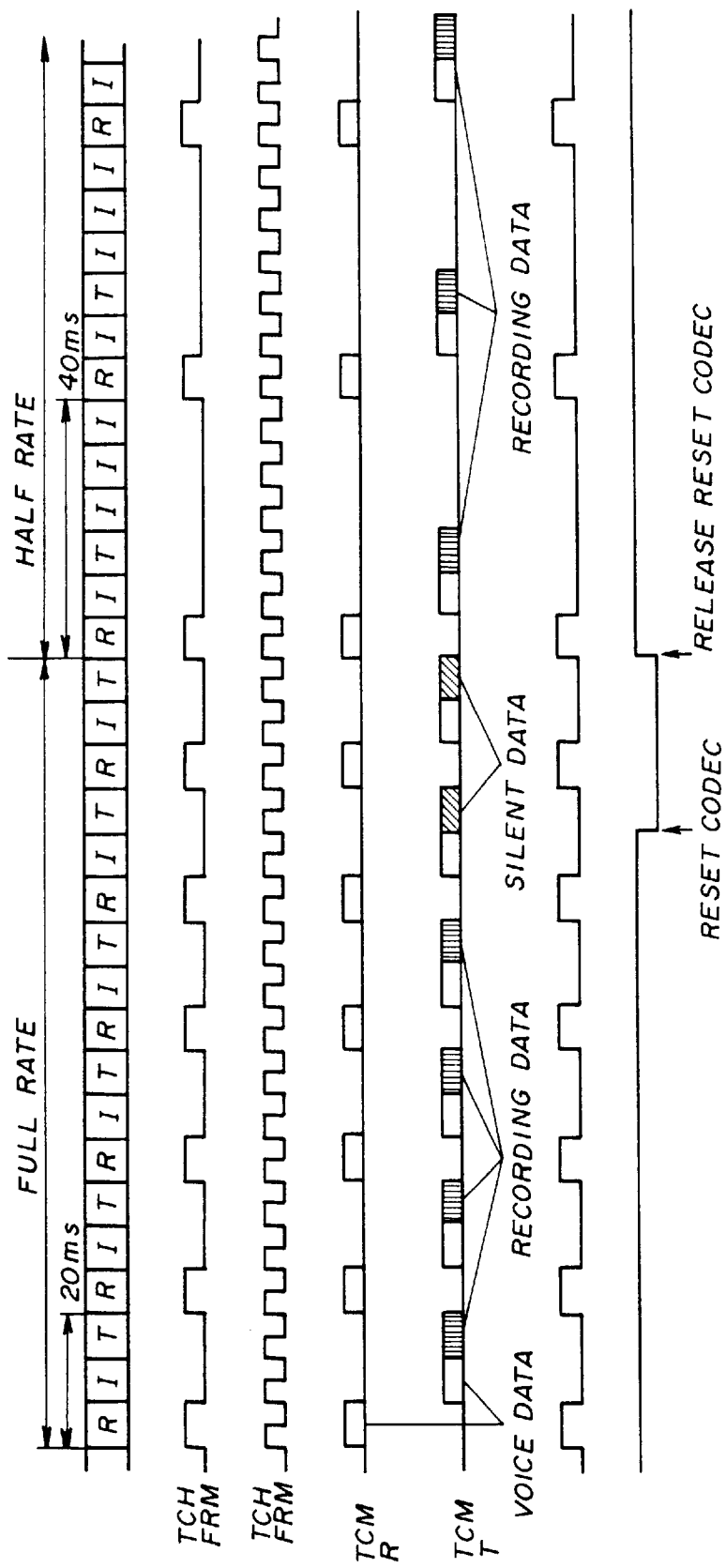
FIG. 10 is a timing chart illustrating a case in which the mode in the codec recording a downward voice is switched.
Figure 11:
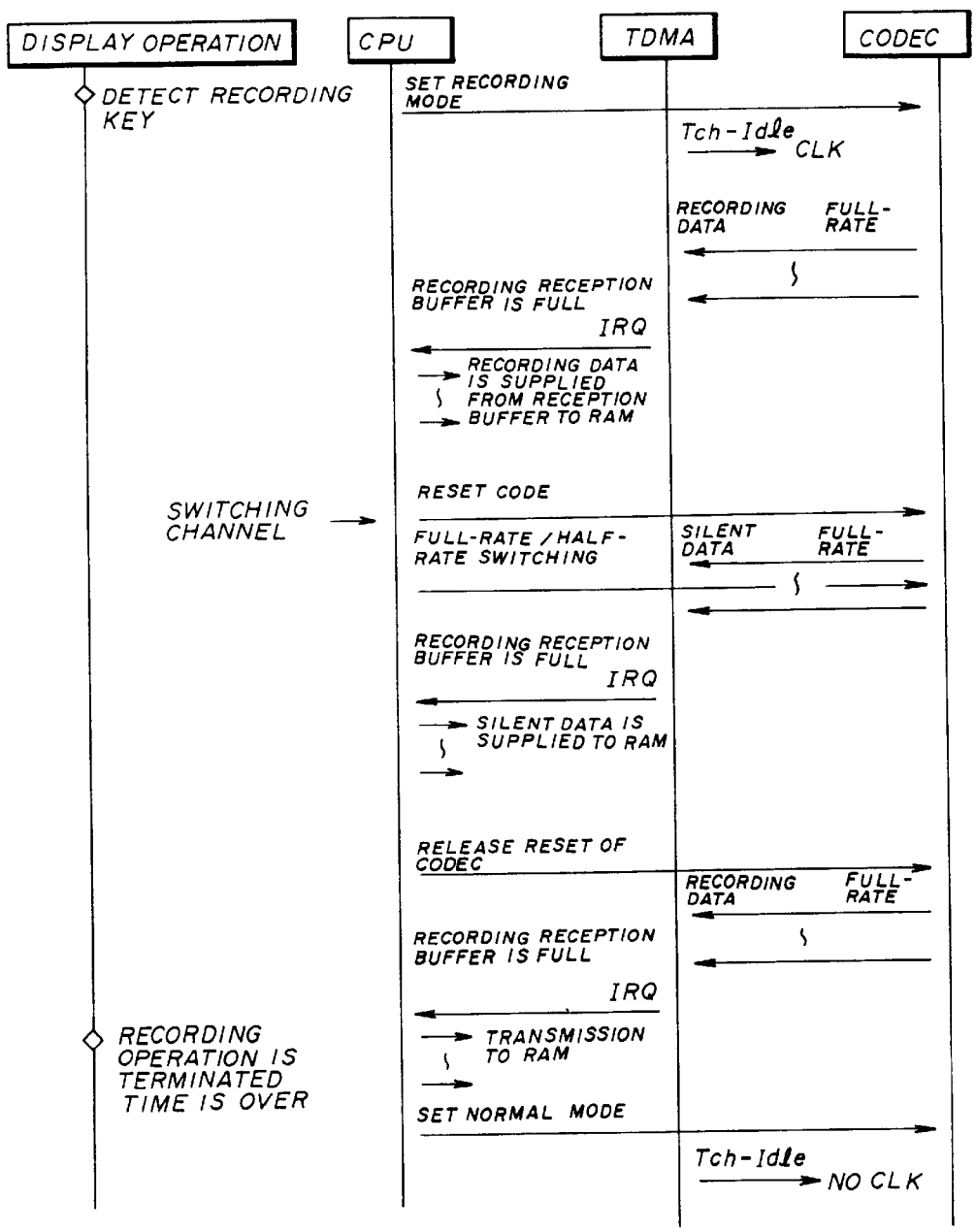
FIG. 11 is a timing chart illustrating controlling procedures in respective circuits when the mode in the codec recording the downward voice is switched.

FIG. 10 is a timing chart illustrating a case where the mode of the codec 3 is switched while the downward voice is being recorded. When the mode of the codec 3 is switched while the downward voice is being recorded, the control is performed in accordance with procedures as shown in FIG. 11. In the case shown in FIGS. 10 and 11, the mode of the codec 3 is switched from the full-rate mode to the half-rate mode while the downward signal is being recorded. This case is established when a user having a dual-mode portable telephone is moved into a zone in which only a channel of the half-rate mode is acceptable. That is, the channel switching operation and the mode switching operation of the codec are simultaneously performed as shown in FIG. 11.

Each data item of the TCH-R and the TCH-C shown in FIG. 10 is actually formed of a pair of data items as shown in FIGS. 6 through 9. To simplify the description, each pair of the data items is shown as a group in FIG. 10.

While receiving signals in the full-rate mode, the voice data from the TCH-T terminal of the codec 3 is supplied to the RAM 4 and recorded therein in the free frame 19. At this time, when it is requested that the full-rate mode be switched to the half-rate mode, the codec 3 is temporarily reset and the mode switching operation starts. Due to the reset of the codec 3, the codec 3 stops operating. In this case, the voice data which should be transmitted to the reception buffer memory 5 is not made. If the data transmission operation to record data in the RAM 4 via the reception buffer memory 5 is continued, noises may be supplied to the RAM 4 via the reception buffer memory 5.

Thus, when the codec 3 is reset, silent data output from the silent data generating unit 7 shown in FIG. 5 is recorded in the RAM 4 as a substitute for the data from the TCH-T terminal of the codec 3. That is, the silent data from the silent data generating unit 7 is supplied to the RAM 4 via the upward interface portion 8, the TDMA processing circuit 2 and the reception buffer memory 5 and recorded therein in the free frame 19. While the codec 3 is in a reset state, the silent data is continuously recorded.

Since the codec 3 is asynchronously reset, the reset operation of the codec 3 may start while the voice data is being recorded. In this case, the TDMA processing circuit 2 which recognizes positions of frames controls the timing so that the silent data is inserted into the voice data.

The reset state of the codec 3 is released and the mode of the codec 3 is completely switched to the half-rate mode. The voice data in the half-rate mode is then supplied from the TCH-T terminal of the codec 3 to the RAM 4 via the reception buffer memory 5 and recorded therein.

According to the above operations, when the mode of the codec 3 is switched from the full-rate mode to the half-rate mode, the silent data is recorded as a substitute for noises which may be output from the codec 3. Thus, the noises can be prevented from being recorded in the mode switching operation of the codec 3. When the mode is switched from the half-rate mode to the full-rate mode and when the channel is switched, the above operations are performed as in the above case in which the mode is switched from the full-rate mode to the half-rate mode.

Figure 12:
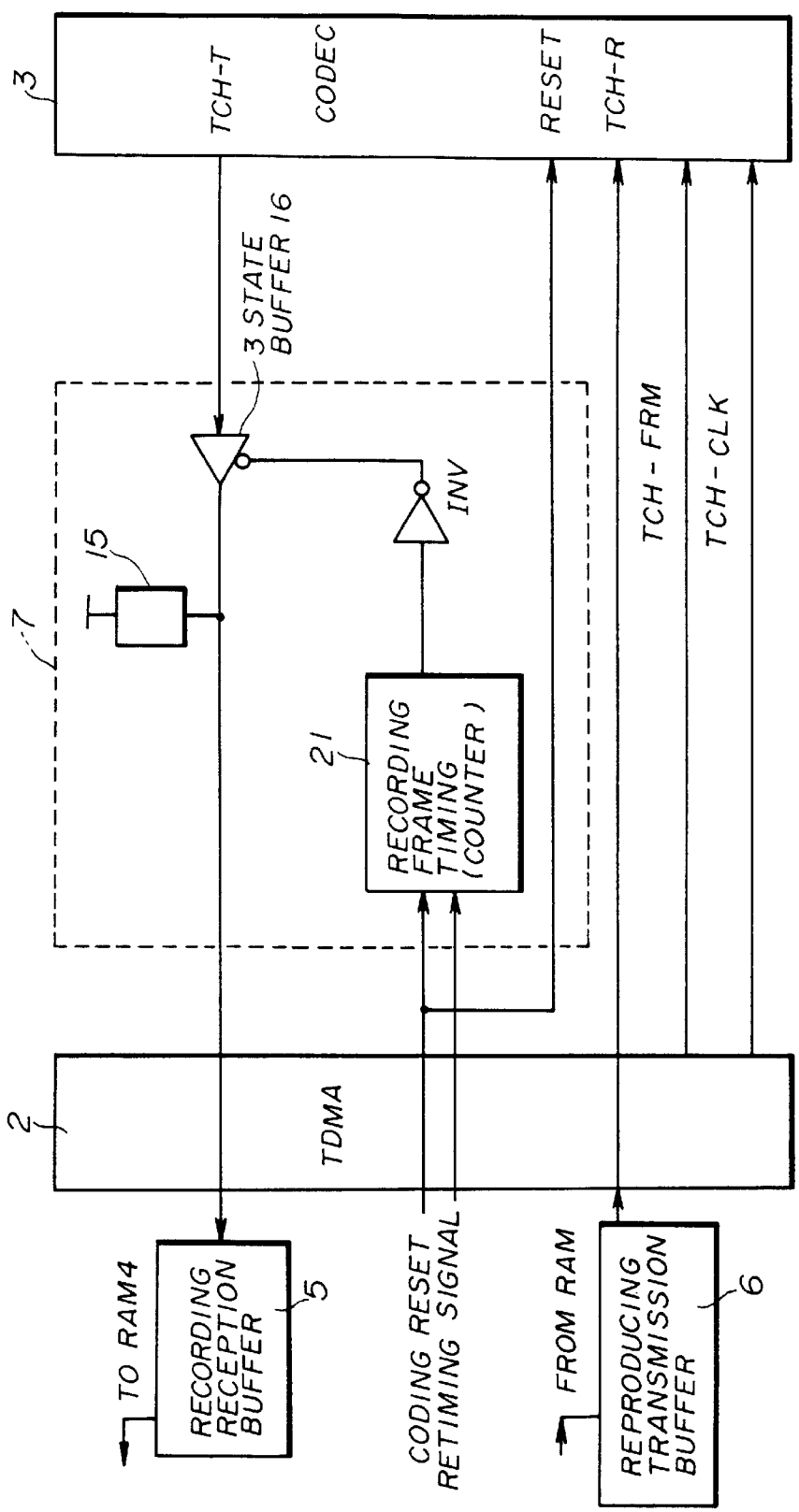
FIG. 12 is a block diagram illustrating an example of a silent data generating portion.

The silent data generating unit 7 is formed as shown in FIG. 12. In FIG. 12, those parts which are the same as those shown in FIG. 5 are given the same reference numbers.

Referring to FIG. 12, a silent data generating unit 7 has a three-state buffer 16 and a pull-up resister 15. The three-state buffer 16 is controlled by a voice frame retiming circuit 21. The voice frame retiming circuit 21 has a counter provided with a codec reset signal and a retiming signal. When the codec 3 is reset as described above, the output of the three-state buffer 16 is maintained at a high impedance. Thus, the silent data of all "0" is supplied, by the pull-up resister 15, to the upward interface portion 8. In this case, the silent data generating unit 7 performs a retiming operation for the reset signal of the codec 3 in a frame in which data should be recorded.

Figure 13:
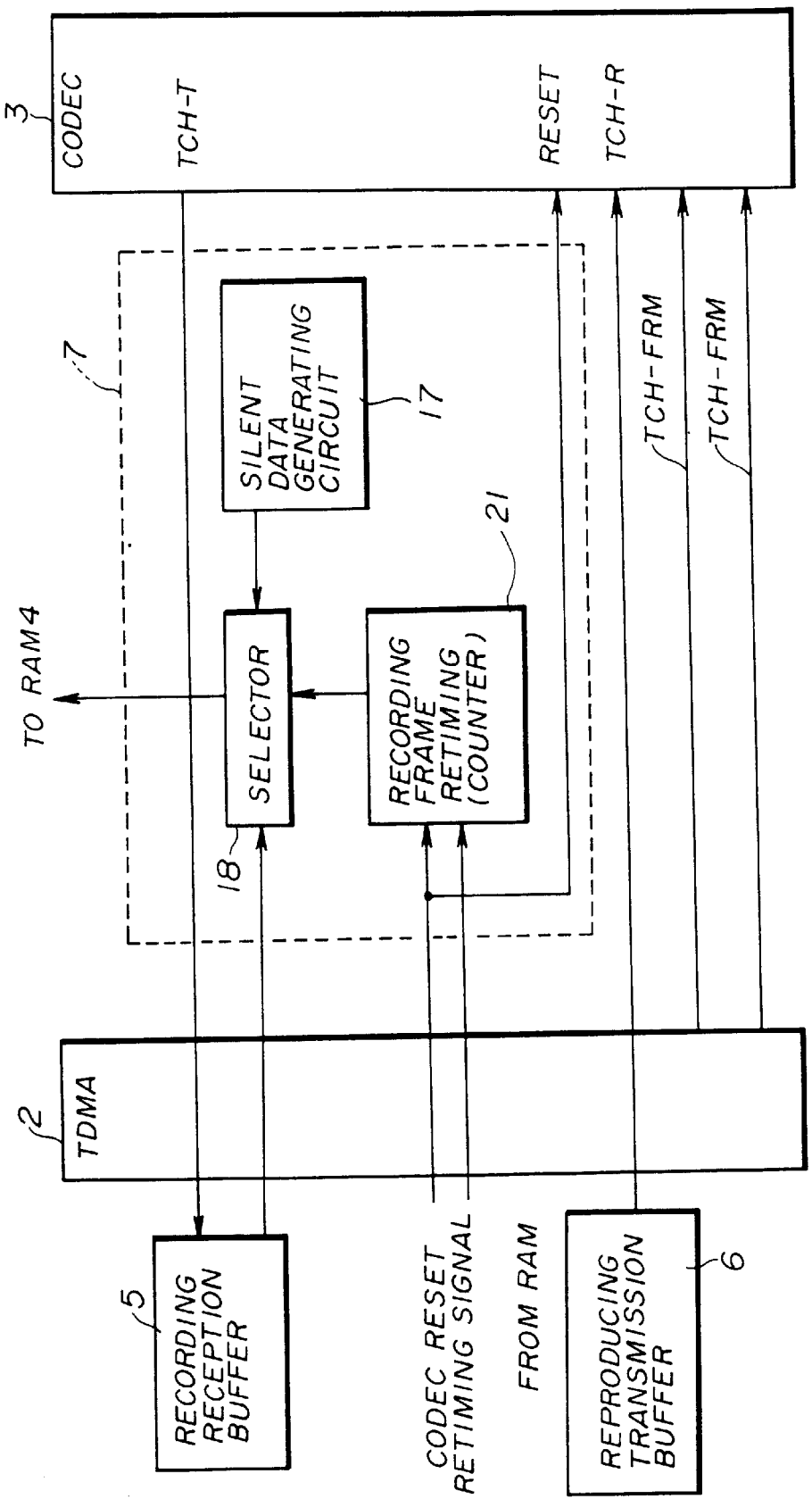
FIG. 13 is a block diagram illustrating another example of the silent data generating portion.

The silent data generating unit 7 may be also formed as shown in FIG. 13. In FIG. 13, those parts which are the same as those shown in FIG. 5 are given the same reference numbers.

Referring to FIG. 13, a silent data generating unit 7 has a silent data generating circuit 17 and a selector 18. The selector 18 is controlled by the voice frame retiming circuit 21 which has a counter provided with the codec reset signal and the retiming signal. The silent data generating unit 7 outputs silent data of a logical high state (H). When the codec 3 is reset as described above, the selector 18 selects the silent data from the silent data generating circuit 17 as a substitute for the data from the TCH-T of the codec. As a result, the silent data is supplied to the RAM 4.

As has been described above, according to the embodiment of the present invention, even if the switching operation for the communication channel or the mode switching operation of the codec is performed while the downward voice is being recorded, noises are prevented from being recorded in the memory (the RAM 4). Thus, the voice can be reproduced without noises which may be generated in the switching operation.

In the above embodiment, the downward voice is recorded. However, the present invention is applicable to a case where a user's voice supplied via the microphone is recorded.

In addition, in the above embodiment, the codec 3 can operate in the full-rate mode (the rate of 11.3 kbps) and in the half-rate mode (the rate of 5.6 kbps). However, the present invention is applicable to codecs which operate in modes for various coding rates and a codec operating in a mode which does not use the error correction code.

The free frame 19 shown in FIGS. 6 and 7 can be used to transmit other control signals. For example, recorded data for a voice searching operation and results of the voice searching operation can be transmitted in the free frame 19. In this case, output and input lines of the codec 3 can be efficiently used.

The portable telephone described above is the mobile communication system defined in the standard "RCR-27C". However, the mobile communication apparatus to which the present invention is applicable is not limited to this. The present invention is applicable to various types of the digital-type mobile communication apparatus having the codec, particularly to a mobile communication apparatus of the cellular system in which the channel switching operation is performed and a mobile communication apparatus having a codec which can operate in a plurality of coding rate modes.

In addition, the present invention is applicable to mobile communication apparatus of various types of division multiplex systems, such as at frequency-division multiplex system (FDMA) and a code-division multiplex system (CDMA) other than the TDMA system.

The present invention is not limited to the aforementioned embodiments, and other variations and modifications may be made without departing from the scope of the claimed invention.

What is claimed is:

1. A voice recording method for a mobile communication apparatus having a codec which codes first voice data into second voice data and decodes the second voice data into the first voice data, a memory in which the second voice data should be recorded and a silent data generating unit which generates silent data, said method comprising the steps of:

(a) successively recording the second voice data in said memory; and (b) stopping recording the second voice data which is being recorded in step (a) and recording the silent data in said memory as a substitute for the second voice data at the moment when the communication channel of the mobile communication apparatus is changed with another one.

2. A voice recording method for a mobile communication apparatus having a codec which codes first voice data into second voice data which should be transmitted via a wireless transmission path and decodes the second voice data which is received via the wireless transmission path into the first voice data, a memory in which the second voice data should be recorded, a controlling unit for controlling, transmitting, receiving and recording of the second voice data and whose performance is time divided to a transmitting period, a receiving period and a first period in which said controlling unit does not control transmitting nor receiving of the second voice data, said method comprising the steps of:

(a) controlling recording of said second voice data in the first period;

(b) stopping controlling recording of the second voice data in the transmitting period and receiving period; and (c) recording silent data as a substitute for the second voice data at the moment when the communication channel of the mobile communication apparatus is changed with another one.

3. A voice recording method for a mobile communication apparatus having a codec which codes first voice data into second voice data which should be transmitted via a wireless transmission path and decodes the second voice data which is received via the wireless transmission path into the first voice data, a memory in which the second voice data should be recorded, a controlling unit for controlling, transmitting, receiving and recording of the second voice data and whose performance is time divided to a transmitting period, a receiving period and a first period in which said controlling unit does not control transmitting nor receiving of the second voice data, said method comprising the steps of:

(a) controlling recording of said second voice data in the first period;

(b) stopping controlling recording of the second voice data in the transmitting period and receiving period; and (c) recording silent data as a substitute for the second voice data at the moment when the coding rate of said codec is changed with another one.

4. A mobile communication apparatus having a voice recording unit, said voice recording unit comprises:

a codec which codes first voice data into second voice data and decodes the second voice data into the first voice data:

a memory in which the second data should be recorded;

a silent data generating unit which generates silent data; and a control unit which causes the second data to be stopped recording and the silent data to be recorded in said memory as substitute for the second voice data at the moment when the communication channel of the mobile communication apparatus is changed with another one.

5. The mobile communication apparatus as claimed in claim 4, wherein said silent data generating unit comprises:

a three-state buffer;

a pull-up resister connected to an output terminal of said three-state buffer; and a control circuit performing a control operation by which said three-state buffer is set at a high impedance so that a logical high state corresponding to the silent data is generated when said control circuit receives a reset signal for said codec.

6. The mobile communication apparatus as claimed in claim 4, wherein said silent data generating unit comprises:

a silent data generating circuit which outputs the silent data;

a selector which selects one of the silent data from said silent data generating circuit and voice data output from said codec at a first rate, selected data being supplied to said memory; and a control circuit which controls said selector so that the silent data is supplied to said memory when said control circuit receives a reset signal for said codec.

7. A voice recording method for a mobile communication apparatus having a codec which codes first voice data into second voice data and decodes the second voice data into the first voice data, a memory in which the second voice data should be recorded and a silent data generating unit which generates silent data, said method comprising the steps of:

(a) successively recording the second voice data in said memory; and (b) stopping recording the second voice data which is being recorded in step (a) and recording the silent data in said memory as a substitute for the second voice data at the moment when the coding rate of said codec is changed with another one.

8. A mobile communication apparatus having a voice recording unit, said voice recording unit comprises:

a codec which codes first voice data into second voice data and decodes the second voice data into the first voice data;

a memory in which the second data should be recorded;

a silent data generating unit which generates silent data; and a control unit which causes the second data to be stopped recording and the silent data to be recorded in said memory as substitute for the second voice data at the moment when the coding rate of said codec is changed with another one.

* * * * *